Sept. 3, 1940.   W. E. HASELWOOD   2,213,701
FISHING SPOON
Filed Aug. 8, 1938
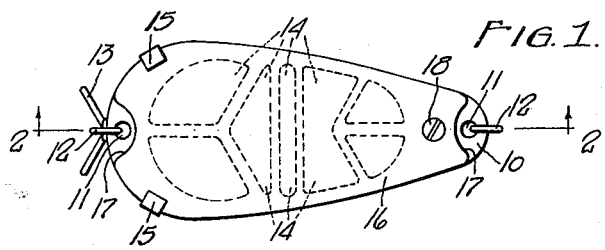
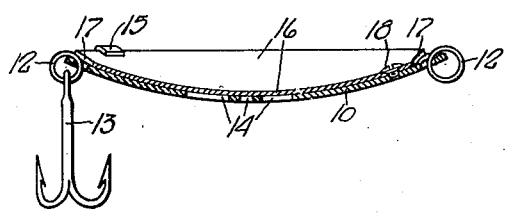
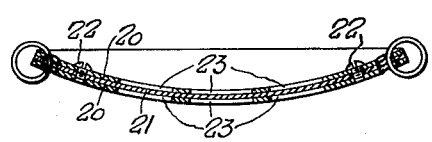
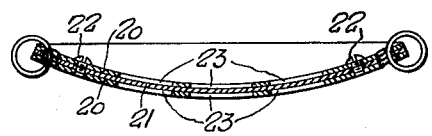
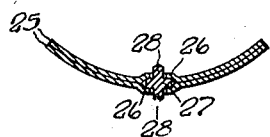
WILLIS E. HASELWOOD.
INVENTOR.
BY Oltsch & Knoblock
ATTORNEYS.

Patented Sept. 3, 1940

2,213,701

UNITED STATES PATENT OFFICE 2,213,701

FISHING SPOON

Willis E. Haselwood, Elkhart, Ind., assignor to South Bend Bait Company, South Bend, Ind., a corporation of Indiana Application August 8, 1938, Serial No. 223,587

10 Claims. (Cl. 43—42)

This invention relates to improvements in fishing spoons.

The primary object of the invention is to provide a spoon having apertures therein covered by colored transparent material, so that light will be transmitted through the transparent material to give a novel effect when viewed therebelow while in water.

A further object is to provide a fishing spoon having a plurality of openings therein to provide a design, and translucent material spanning said apertures to provide a novel light effect of predetermined design.

A further object is to provide novel means for mounting translucent material on a fishing spoon.

A further object is to provide a novel, inexpensive and attractive fishing lure having a colored design appearance while in the water and when viewed from above or below.

In the drawing:

Fig. 1 is a top plan view of a fishing spoon.

Fig. 2 is a longitudinal sectional view taken on line 2—2 of Fig. 1.

Fig. 3 is a longitudinal sectional view similar to Fig. 2 illustrating a modified embodiment of the invention.

Fig. 4 is a transverse sectional view of another embodiment of the invention.

Fig. 5 is a view in side elevation of the translucent insert used in the embodiment illustrated in Fig. 4.

Referring to the drawing, and particularly to Figs. 1 and 2, the numeral 10 designates a concavo-convex metal plate of any conventional or desired size and shape suitable for use as a fishing spoon. The plate 10 is preferably provided with small apertures 11 adjacent its ends and positioned along its longitudinal median line, and rings 12 or like attaching means pass through said apertures. One ring may serve for line attachment and the other to mount a hook 13. The central or body portion of the plate 10 is provided with a plurality of apertures 14 of any desired size and shape, and arranged in any desired relation to provide a design or ornamental effect. A pair of tabs 15 are formed integrally with the plate 10 on opposite sides and at the rear thereof.

A sheet of colored transparent material 16, such as cellulose acetate or the like, of concavo convex form, fits snugly against plate 10 at the concave face thereof. Sheet 16 is of substantially the same size and shape as plate 10, but its ends are preferably recessed at 17 to clear the plate apertures 11. Tabs 15 are bent around the edge of sheet 16 and down upon the face thereof to hold the rear end thereof to the plate; and suitable securing means 18 as a screw or the like, secure the front portion of the sheet 16 to plate 10.

The construction affords two different light effects when in the water. The colored sheet 16 serves to reflect colored light from substantially the full extent thereof when viewed from above, and permits substantial light areas of the shape, size and arrangement of apertures 14 to be viewed against the dark outline of the plate from below. Obviously, the apertures 14 may be of a size and shape to simulate a natural prey of fish, the movement of the concavo-convex spoon in the water tending to enhance this simulation. From a structural standpoint this construction permits ready replacement of the translucent sheet 16, by merely removing the screw 18 to separate said sheet from the metal spoon. The use of cellulose acetate or like material as the translucent element is desirable by reason of the translucency of such material, the wide range of color obtainable in such material, and the resilience and strength of the material.

The embodiment illustrated in Fig. 3 employs upper and lower concavo-convex metal plates 20 and a thin sheet 21 of colored translucent material interposed therebetween. The parts may be permanently secured together by means of securing means 22, such as screws, rivets or the like. The metal plates 20 are provided with registering complementary apertures 23. The advantages of this embodiment are that a comparatively thin sheet of translucent material, possessing less rigidity and strength than required of the sheet 16 in the preferred embodiment, may be employed. This serves to increase the light transmitting qualities of the lure, and hence improve the appearance of the lure when viewed from below. Additionally, when this embodiment of the lure is viewed from above, the light reflected from the colored sheet 21 is in the same pattern or design as apertures 23.

Referring to the embodiment illustrated in Figs. 4 and 5, a pair of interfitting concavo-convex metal plates 25 are provided, suitably secured together. Complementary apertures are provided in the plates, and said plates are oppositely off-set at 26 adjacent said apertures. An insert of translucent material is mounted between the plates. As illustrated in Fig. 5, this insert preferably comprises a central body portion or strip 27, and projections 28 integral therewith and extending at opposite sides thereof. The central portion 27 is of a dimension to fit snugly in the pocket formed by off-sets 26, and projections 28 extend through and preferably project beyond the faces of plates 25. The projection 28 may be in the form of beads, or may be elongated or otherwise configured in shape and outline as illustrated in Fig. 5. To increase the light variations, the outer end portions or faces of the projections 28 may be faceted or otherwise configured. In this construction it is unnecessary to use securing means directly upon the translucent material, since the plate off-sets form a retaining pocket for the insert, and the seating of projections 28 in the plate apertures restrain movement of the insert in said pocket. The same basic light effect as provided by the other embodiments is provided here, though obviously the construction gives a specifically different effect similar to that produced by colored glass beads, especially where the projections 28 are faceted.

I claim:

1. A blade construction for use in a fishing lure comprising a metal plate having an aperture, and a translucent member secured to said plate to span at least the major portion of said aperture and overlapping at least a portion of the plate around said aperture.

2. A blade construction for use in a fishing lure comprising a concavo-convex metal plate having an aperture, and a colored translucent member carried by said plate and extending across at least the major portion of said aperture to transmit colored light therethrough visible in water from below said plate said member overlapping at least a portion of the plate around said aperture, and means spaced from said aperture for securing said member to said plate.

3. A fishing spoon comprising a metal plate having a plurality of configured apertures therein, and a colored translucent member secured to said plate and spanning said apertures, whereby colored light areas outlined by said apertures are visible in water below said plate.

4. A fishing spoon comprising a metal plate having an aperture intermediate its ends, line attaching means carried by said plate, hook mounting means carried by said plate, a sheet of translucent material bearing on said plate and spanning said aperture; sheet retaining means carried by one end of said plate, and means securing the other end of said sheet to said plate.

5. A fishing spoon comprising a pair of metal plates, a sheet of translucent material interposed between said plates in face engagement therewith, said plates having complementary apertures therein exposing said sheet, and means securing said plates and sheet in unitary relation.

6. A fishing spoon comprising a pair of complementary concavo-convex opaque plates having registering apertures therein, a sheet of colored translucent material interposed between said plates and spanning said apertures, and means securing said plates and sheet in fixed relation to each other.

7. A fishing spoon comprising a pair of complementary opaque plates having registering apertures, said plates being oppositely off-set adjacent said apertures to form a pocket therebetween, and an insert of translucent material retained in said pocket.

8. A fishing spoon as defined in claim 7, wherein said insert includes projections seating in said plate apertures.

9. A fishing spoon comprising a metal plate having an aperture intermediate its ends, line attaching means carried by said plate, a sheet of translucent material in face contacting engagement with at least a portion of said plate and spanning said aperture, and means spaced from said aperture for fixedly securing said sheet to said plate.

10. A blade construction for use in a fishing lure comprising a pair of complementary plates, and means for securing said plates in face contacting engagement, at least one of said plates having an aperture therein through which the other plate is visible, said plates being of contrasting colors.

WILLIS E. HASELWOOD.